United States Patent
Guichard et al.

(10) Patent No.: US 11,351,529 B2
(45) Date of Patent: *Jun. 7, 2022

(54) CATALYST FOR USE IN HYDROTREATMENT, COMPRISING METALS FROM GROUPS VIII AND VIB, AND PREPARATION WITH CITRIC ACID AND C1-C4 DIALKYL SUCCINATE

(75) Inventors: Bertrand Guichard, Izeaux (FR); Laurent Simon, Villeurbanne (FR); Valentina De Grandi, Schaerbeek (BE); Delphine Minoux, Nivelles (FR); Jean-Pierre Dath, Beloeil (BE)

(73) Assignees: IFP ENERGIES NOUVELLES, Rueil-Malmaison (FR); TOTAL RAFFINAGE MARKETING, La Defense (FR)

( * ) Notice: Subject to any disclaimer, the term of this patent is extended or adjusted under 35 U.S.C. 154(b) by 1133 days.

This patent is subject to a terminal disclaimer.

(21) Appl. No.: 14/005,936

(22) PCT Filed: Feb. 10, 2012

(86) PCT No.: PCT/FR2012/000052
§ 371 (c)(1),
(2), (4) Date: Dec. 3, 2013

(87) PCT Pub. No.: WO2012/127128
PCT Pub. Date: Sep. 27, 2012

(65) Prior Publication Data
US 2014/0076780 A1    Mar. 20, 2014

(30) Foreign Application Priority Data

Mar. 18, 2011   (FR) .................................. 11/000.840

(51) Int. Cl.
| | | |
|---|---|---|
| *B01J 31/34* | (2006.01) | |
| *B01J 31/02* | (2006.01) | |
| *B01J 38/52* | (2006.01) | |
| *C10G 45/04* | (2006.01) | |
| *B01J 37/20* | (2006.01) | |
| *C10G 47/12* | (2006.01) | |
| *B01J 23/882* | (2006.01) | |
| *B01J 23/94* | (2006.01) | |
| *B01J 35/00* | (2006.01) | |
| *B01J 31/04* | (2006.01) | |
| *B01J 38/62* | (2006.01) | |
| *C10G 45/08* | (2006.01) | |
| *C10G 45/50* | (2006.01) | |
| *B01J 23/883* | (2006.01) | |
| *B01J 37/02* | (2006.01) | |
| *B01J 23/85* | (2006.01) | |

(Continued)

(52) U.S. Cl.
CPC ............... *B01J 31/34* (2013.01); *B01J 23/85* (2013.01); *B01J 23/882* (2013.01); *B01J 23/883* (2013.01); *B01J 23/94* (2013.01); *B01J 31/0201* (2013.01); *B01J 31/0209* (2013.01); *B01J 31/04* (2013.01); *B01J 35/002* (2013.01); *B01J 37/0203* (2013.01); *B01J 37/20* (2013.01); *B01J 38/52* (2013.01); *B01J 38/62* (2013.01); *C10G 45/04* (2013.01); *C10G 45/06* (2013.01); *C10G 45/08* (2013.01); *C10G 45/10* (2013.01); *C10G 45/12* (2013.01); *C10G 45/50* (2013.01); *C10G 45/54* (2013.01); *C10G 45/68* (2013.01); *C10G 47/12* (2013.01); *C10G 47/14* (2013.01); *C10G 47/18* (2013.01); *B01J 21/04* (2013.01); *B01J 21/12* (2013.01); *B01J 37/0009* (2013.01); *C10G 2300/1055* (2013.01); *C10G 2300/202* (2013.01)

(58) Field of Classification Search
None
See application file for complete search history.

(56) References Cited

U.S. PATENT DOCUMENTS

| | | | |
|---|---|---|---|
| 7,956,000 B2 | 6/2011 | Jansen et al. | |
| 2007/0275845 A1 | 11/2007 | Jansen et al. | |

(Continued)

FOREIGN PATENT DOCUMENTS

| | | | | |
|---|---|---|---|---|
| WO | WO-2005 035691 | | 4/2005 | |
| WO | WO 2005035691 | * | 4/2005 | ............. C10G 45/08 |

(Continued)

OTHER PUBLICATIONS

Nakabayashi et al. (J. Phys. Chem. A, 1999, 103, 8595-8603 (Year: 1999).*

(Continued)

*Primary Examiner* — Yun Qian
(74) *Attorney, Agent, or Firm* — Millen, White, Zelano and Branigan, P.C.; Harry B. Shubin

(57) ABSTRACT

A catalyst which comprises an amorphous support based on alumina, a C1-C4 dialkyl succinate, citric acid and optionally acetic acid, phosphorus and a hydrodehydrogenating function comprising at least one element from group VIII and at least one element from group VIB; the most intense bands comprised in the Raman spectrum of the catalyst are characteristic of Keggin heteropolyanions (974 and/or 990 $cm^{-1}$), C1-C4 dialkyl succinate and citric acid (in particular 785 and 956 $cm^{-1}$). Also a process for preparing said catalyst in which a catalytic precursor in the dried, calcined or regenerated state containing the elements of the hydrodehydrogenating function, and optionally phosphorus, is impregnated with an impregnation solution comprising at least one C1-C4 dialkyl succinate, citric acid and optionally at least one compound of phosphorus and optionally acetic acid, and is then dried. Further, the use of said catalyst in any hydrotreatment process.

20 Claims, No Drawings

(51) Int. Cl.
*C10G 45/06* (2006.01)
*C10G 45/68* (2006.01)
*C10G 45/10* (2006.01)
*C10G 45/12* (2006.01)
*C10G 45/54* (2006.01)
*C10G 47/14* (2006.01)
*C10G 47/18* (2006.01)
*B01J 21/04* (2006.01)
*B01J 37/00* (2006.01)
*B01J 21/12* (2006.01)

(56) References Cited

U.S. PATENT DOCUMENTS

| | | | |
|---|---|---|---|
| 2008/0194892 A1* | 8/2008 | Cholley | B01J 23/85 585/277 |
| 2009/0298677 A1 | 12/2009 | Radlowski et al. | |
| 2011/0094939 A1 | 4/2011 | Jansen et al. | |

FOREIGN PATENT DOCUMENTS

| | | |
|---|---|---|
| WO | WO-2006 077326 | 7/2006 |
| WO | WO-2007 070394 | 6/2007 |

OTHER PUBLICATIONS

International Search Report for PCT/FR2012/000052, Date of completion of the international search: May 21, 2012, Date of completion of the international search: May 29, 2012.

* cited by examiner

CATALYST FOR USE IN HYDROTREATMENT, COMPRISING METALS FROM GROUPS VIII AND VIB, AND PREPARATION WITH CITRIC ACID AND C1-C4 DIALKYL SUCCINATE

The invention relates to a catalyst, its preparation method and its use in the field of hydrotreatment.

A catalyst for the hydrotreatment of hydrocarbon cuts is usually intended to eliminate the sulphur-containing or nitrogen-containing compounds contained in them in order, for example, to bring an oil product to the required specifications (sulphur content, aromatics content, etc) for a given application (automotive fuel, gasoline or gas oil, domestic fuel, jet fuel). It may also act to pre-treat that feed in order to eliminate impurities from it before it undergoes various transformation processes to modify its physico-chemical properties; examples are reforming processes, vacuum distillate hydrocracking, catalytic cracking or hydroconversion of atmospheric or vacuum residues. The composition and use of hydrotreatment catalysts are described in great detail in the article by B S Clausen, H T Topsøe and F E Massoth in the publication Catalysis Science and Technology, volume 11 (1996), Springer-Verlag. After sulphurization, several surface species are present on the support, and not all of them perform in the target reactions. Such species are described in great detail in the publication by Topsøe et al in number 26 of Catalysis Review Science and Engineering, 1984, pages 395-420.

Tightening of automotive pollution standards in the European community (Official Journal of the European Union, L76, 22 Mar. 2003, Directive 2003/70/CE, pages L76/10-L76/19) has forced refiners to greatly reduce the sulphur content of diesel fuels and gasolines (to a maximum of 10 parts per million by weight (ppm) of sulphur on 1 Jan. 2009, as opposed to 50 ppm on 1 Jan. 2005). Further, refiners are obliged to use more and more refractory feeds for the hydrotreatment processes, on the one hand because crudes are becoming heavier and thus contain more impurities, and on the other hand because the number of conversion processes in refineries is increasing. In fact, they generate cuts which are more difficult to hydrotreat than cuts derived directly from atmospheric distillation. An example that can be mentioned is the gas oil cut derived from catalytic cracking, also known as LCO (light cycle oil), which refers to its high aromatic compounds content. Such cuts are co-treated with the gas oil cut derived from atmospheric distillation; they necessitate catalysts having greatly improved hydrodesulphurizing and hydrogenating functions compared with traditional catalysts in order to reduce the quantity of aromatics to obtain a density and cetane index which comply with specifications.

Furthermore, conversion processes such as catalytic cracking or hydrocracking use catalysts with an acid function, which renders them particularly sensitive to the presence of nitrogen-containing impurities, and particularly basic nitrogen-containing compounds. It is thus necessary to use catalysts to pre-treat said feeds in order to remove those compounds. Such hydrotreatment catalysts also require an improved hydrogenating function because the first hydrodenitrogenation step is known to be a step which hydrogenates the aromatic ring adjacent to the C—N bond.

Thus, it is important to discover ways of preparing hydrotreatment catalysts so as to obtain novel catalysts with improved performances.

Adding an organic compound to hydrotreatment catalysts to improve their activity is now familiar to the skilled person. Many patents protect the use of various series of organic compounds, such as mono-, di or poly-alcohols which may be etherified (WO96/41848, WO01/76741, U.S. Pat. Nos. 4,012,340, 3,954,673, EP0601722). Catalysts modified with C2-C14 monoesters are described in patent applications EP0466568 and EP1046424, however those modifications do not always increase the performance of the catalyst sufficiently for refiners to be able to comply with ever more restrictive specifications concerning the sulphur content of fuels.

To overcome this problem, patent WO2006/077326 from Total proposes the use of a catalyst comprising metals from groups VIB and VIII, a refractory oxide as a support, and an organic compound comprising at least 2 carboxylic ester functions with formula R1-O—CO—R2-CO—O—R1 or R1-CO—O—R2-O—CO—R1 in which each R1 independently represents a C1 to C18 alkyl group, a C2 to C18 alkenyl group, a C6 to C18 aryl group, a C3 to C8 cycloalkyl group, a C7 to C20 alkylaryl or arylalkyl group, or the two R1 groups together form a divalent C2 to C18 group, and R2 represents a C1 to C18 alkylene group, a C6 to C18 arylene group, a C3 to C7 cycloalkylene group or a combination thereof, the carbonaceous chain of the hydrocarbon groups represented by R1 and R2 possibly containing or carrying one or more heteroatoms selected from N, S and O, and each of the groups R1 and R2 possibly carrying one or more substituents with formula —C(=O)O—R1 or —O—C(=O)—R1 where R1 has the meaning given above. A preferred embodiment uses C1-C4 dialkyl succinate and in particular dimethyl succinate, which is used in an example. Those compounds may be introduced in the presence of a solvent (a long list of solvents is cited) or a carboxylic acid. Of the thirty or so acids which are specifically cited, acetic acid is present but is not cited among the ten or so preferred acids. It should be noted here that citric acid is preferred.

The process for preparing the catalyst as described in patent WO2006/077326 comprises maturation and heat treatment steps that may take several days, for example 49 days to 115 days, which would greatly limit the production of those catalysts and as a result necessitates improvements.

Other prior art patents describe a gain in the activity linked to a combined use of an organic acid or an alcohol on a hydrotreatment catalyst. Thus, the patent application published as JP1995-136523 from KK Japan Energy proposes a solution consisting of:

in a first preferred implementation of the invention, preparing a solution containing a catalyst support, one or more metals from group VI of the periodic classification of the elements, and from group VIII, an organic acid. In a second preferred implementation of the invention, this solution also comprises a phosphorus precursor;

heat treating between 200° C. and 400° C.;

impregnating the catalyst obtained with an organic acid or an alcohol in a ratio of 0.1 to 2 per mole of metals.

One of the preferred implementations of the invention then comprises drying at a temperature below 200° C., while a second preferred implementation comprises a final heat treatment at a temperature of 400° C. or more.

It has been observed that such catalysts do not have sufficient activity to satisfy new environmental regulations because of the ever more hydrogen-depleted feeds made available to refiners.

Similarly, patent WO2005/035691 claims an activation process which, in outline, can reduce the quantity of the crystalline $CoMoO_4$ type phase present on regenerated catalysts comprising oxides of metals from groups VIII and VIB, the process comprising bringing regenerated catalyst into contact with an acid and an organic additive. A combination of citric acid (CA) and polyethylene glycol (PEG) was used on the regenerated catalyst in many examples for this purpose.

The present invention concerns a catalyst and its preparation process, the catalyst being able to be used for hydrotreatment and allowing catalytic performance (in particular catalytic activity) to be improved compared with prior art catalysts. In fact, it has been shown that using a C1-C4 dialkyl succinate, in particular dimethyl, coupled with citric acid, optionally in the presence of acetic acid on a dried, calcined or regenerated catalytic precursor surprisingly results in substantially improved catalytic activity.

More precisely, the invention concerns a catalyst comprising an amorphous support based on alumina, at least one C1-C4 dialkyl succinate, citric acid, phosphorus and a hydrodehydrogenating function comprising at least one element from group VIII and at least one element from group VIB, with the Raman spectrum of the catalyst comprising bands at 990 and/or 974 $cm^{-1}$, characteristic of at least one Keggin heteropolyanion, the characteristic bands of said succinate and characteristic bands of citric acid. In a preferred embodiment, the catalyst also comprises acetic acid.

The invention also concerns the sulphurized catalyst. It is obtained by sulphurizing the catalyst described in the present application.

The hydrodehydrogenating function comprises at least one element from group VIII (preferably cobalt and/or nickel) and at least one element from group VIB (preferably molybdenum and/or tungsten). Preferably, the hydrodehydrogenating function comprises molybdenum and cobalt and/or nickel.

The catalyst obtained has a characteristic Raman spectrum having the following:

1) Characteristic bands of the Keggin type heteropolyanion or heteropolyanions, $PXY_{11}O_{40}^{x-}$ and/or $PY_{12}O_{40}^{x-}$, where Y is a metal from group VIB and X is a metal from group VIII.

According to Griboval, Blanchard, Payen, Fournier, Dubois in Catalysis Today 45 (1998), 277, FIG. 3e), the principal bands of the structure $PCoMo_{11}O_{40}^{x-}$ for the dried catalyst are at 232, 366, 943, 974 $cm^{-1}$ and according to M T Pope, in "Heteropoly and Isopoly Oxometallates", Springer Verlag, p 8, these bands are not characteristic of the nature of atom X or Y, but of the structure of the heteropolyanion. The most intense characteristic band of this type of lacunary Keggin heteropolyanion is located at 974 $cm^{-1}$.

According to Griboval, Blanchard, Gengembre, Payen, Fournier, Dubois, Bernard in Journal of Catalysis 188 (1999), 102, FIG. 1a), the principal bands of $PMo_{12}O_{40}^{x-}$ in the bulk state of the heteropolyanion, for example with cobalt as a counter ion, are at 251, 603, 902, 970, 990 $cm^{-1}$. The most intense characteristic band of this Keggin heteropolyanion is at 990 $cm^{-1}$. Again, M T Pope, in "Heteropoly and Isopoly Oxometallates", Springer Verlag, p 8, informs us that these bands are not characteristic of the nature of the X or Y atom, but of the structure of the complete, lacunary or substituted Keggin heteropolyanion.

2) Characteristic bands of the dialkyl succinate(s) used. The Raman spectrum of dimethyl succinate constitutes a unique fingerprint of this molecule. In the 300-1800 $cm^{-1}$ zone of the spectrum, this spectrum is characterized by the following series of bands (only the most intense bands are reported, in $cm^{-1}$): 391, 853 (most intense band), 924, 964, 1739 $cm^{-1}$. The most intense characteristic band of dimethyl succinate is at 853 $cm^{-1}$. The spectrum of diethyl succinate includes the following principal bands in the spectrum zone under consideration: 861 (most intense band), 1101, 1117 $cm^{-1}$. Similarly for dibutyl succinate: 843, 1123, 1303, 1439, 1463 $cm^{-1}$ and for diisopropyl succinate: 833, 876, 1149, 1185, 1469 (most intense band), 1733 $cm^{-1}$.

3) Characteristic bands of citric acid; the principal bands are at: 785, 947, 956, 908 $cm^{-1}$. The most intense characteristic bands of citric acid are at 785 and 956 $cm^{-1}$.

In a preferred embodiment, the catalyst also comprises acetic acid with its most intense characteristic Raman band at 896 $cm^{-1}$. The other characteristic bands of acetic acid are at: 448, 623, 896 $cm^{-1}$. The most intense band is at 896 $cm^{-1}$.

The exact position of the bands, their shapes and their relative intensities may vary to a certain extent as a function of the spectrum recording conditions, but they remain characteristic of this molecule. The Raman spectra of organic compounds are also well documented either in Raman spectrum databases (see, for example, the Spectral Database for Organic Compounds, http://riodb01.ibase.aist.go.jp/sdbs/cgi-bin/direct_frame_top.cgi) or from the product suppliers (see, for example, www.sigmaaldrich.com).

The Raman spectra were obtained with a dispersive Raman type spectrometer provided with an ionized argon laser (514 nm). The laser beam was focused on the sample using a microscope provided with a ×50 long working length objective. The power of the laser at the sample was of the order of 1 mW. The Raman signal emitted by the sample was collected by the same objective and dispersed using a 1800 tr/mn grating then collected by a CCD detector. The spectral resolution obtained was of the order of 0.5 $cm^{-1}$. The spectral zone recorded was in the range 300 to 1800 $cm^{-1}$. The acquisition period was fixed at 120 s for each recorded Raman spectrum.

The dialkyl succinate is advantageously dimethyl succinate, dibutyl succinate or diisopropyl succinate.

Preferably, the dialkyl succinate used was dimethyl succinate, and the spectrum of the catalyst has principal Raman bands at 990 and/or 974 $cm^{-1}$, characteristic of Keggin heteropolyanion(s), and at 853 $cm^{-1}$, characteristic of dimethyl succinate and at 785 and 956 $cm^{-1}$ characteristic of citric acid, and possibly at 896 $cm^{-1}$, characteristic of acetic acid.

Preferably, the catalyst of the invention comprises a support constituted by alumina or silica-alumina.

The catalyst of the invention may also comprise boron and/or fluorine and/or silicon, preferably boron and/or fluorine.

A process for preparing the catalyst of the invention is also described and comprises at least one step for impregnation of a dried catalytic precursor at a temperature of less than 180° C. containing at least one hydrodehydrogenating function and possibly phosphorus as well as an amorphous support, using a solution comprising a combination of citric acid (optionally with acetic acid) and C1-C4 dialkyl succinate in the presence or absence of a compound containing phosphorus, followed by a step for maturation of said impregnated catalytic precursor containing phosphorus, then a step for drying at a temperature of less than 200° C., without a subsequent calcining step (heat treatment in air); the catalyst obtained preferably undergoes a sulphurization step.

A process for preparing a catalyst of the invention as described above is also described, but starting from a calcined catalytic precursor, said catalytic precursor having been prepared in the same manner as before but calcined after the drying step at a temperature below 180° C. In the same manner as above, the catalyst obtained preferably undergoes a sulphurization step.

Calcining (heat treatment in an oxidizing atmosphere) is carried out at at least 350° C. during preparation of a fresh catalyst (i.e. which has not yet been used). The temperature is less than 600° C., usually less than 550° C., for example 350° C. to 550° C., and preferably 400-520° C., or preferably 420-520° C. or 450-520° C.; temperatures below 500° C. are usually advantageous.

A process for preparing a catalyst of the invention as described above is also described, but starting from a spent (has been used) and regenerated (combustion of carbon deposited on the spent catalyst) catalyst. Regeneration is generally carried out at temperatures in the range 350° C. to 550° C., usually in the range 400° C. to 520° C., or in the range 420° C. to 520° C., or in the range 450° C. to 520° C.; temperatures below 500° C. or 480° C. are usually advantageous.

Other embodiments may be envisaged within the scope of the invention; for example, after the drying step, the catalytic precursor undergoes a heat treatment above the drying temperature (which is at most 180° C.) and below the calcining temperature (which is at least 350° C.).

These simple and rapid preparation processes, with individual steps not exceeding a few hours, thus provide better productivity on an industrial scale than the processes of the prior art.

Thus, more precisely, the invention describes a process for the preparation of a catalyst comprising the following steps in succession:

ab) preparing a catalytic precursor containing the elements of the hydrodehydrogenating function, and optionally phosphorus, said precursor having undergone at least one heat treatment;

c) at least one step for impregnation with an impregnation solution comprising at least one C1-C4 dialkyl succinate, citric acid and at least one compound of phosphorus, if the phosphorus has not been introduced in totality by impregnation in step ab), and optionally, acetic acid;

d) a step for maturation;

e) a step for drying at a temperature of less than 200° C., without a subsequent calcining step.

The heat treatment of step ab) comprises at least one step for drying at a temperature of at most 180° C. It may also comprise a calcining step. It may also be included in a regeneration step.

In one preparation implementation with a dried and optionally calcined catalyst, the process of the invention comprises the following steps in succession:

a) at least one step for impregnation of an amorphous support based on alumina with at least one solution containing the elements of the hydrodehydrogenating function, and optionally phosphorus; the product obtained is termed the "catalytic precursor";

b) drying at a temperature below 180° C. optionally followed by calcining at a temperature of at least 350° C., preferably in the range 420° C. to 520° C.; the product is termed the "dried or calcined catalytic precursor";

c) at least one step for impregnation with an impregnation solution comprising at least one C1-C4 dialkyl succinate, citric acid, at least one compound of phosphorus, if the phosphorus has not been introduced in its entirety in step a), and optionally acetic acid;

d) a step for maturation;

e) a step for drying at a temperature of less than 200° C., without a subsequent calcining step.

The invention also describes a process for the preparation of a catalyst starting from a catalytic precursor which is a spent catalyst, comprising the following steps in succession:

a'b') regenerating spent catalyst comprising a hydrodehydrogenating function and optionally phosphorus;

c) at least one step for impregnation with an impregnation solution comprising at least one C1-C4 dialkyl succinate, citric acid and optionally (and preferably) at least one compound of phosphorus, if the phosphorus has not been introduced into the catalyst in its entirety in step a'b'), and optionally acetic acid;

d) a step for maturation;

e) a step for drying at a temperature of less than 200° C., without a subsequent calcining step.

Preferably, the product obtained at the end of step e) undergoes a step f) for sulphurization. The invention also concerns the sulphurized catalyst.

As will be described below, the process of the invention is preferably carried out using the following implementational modes, taken alone or in combination: the support is constituted by alumina or silica-alumina; the whole of the hydrogenating function is introduced during step a); all of the phosphorus is introduced during step a); the dialkyl succinate is dimethyl succinate; step c) is carried out in the presence of water and/or ethanol; step d) is carried out at a temperature in the range 17° C. to 60° C. or 50° C.; step e) is carried out at a temperature in the range 80° C. to 180° C.

In one implementation, the drying step b) is carried out at a temperature of less than 180° C. without heat treatment or subsequent calcining.

As an example, the process of the invention comprises the following steps in succession:

a) at least one step for dry impregnation of said support with a solution containing all of the elements of the hydrodehydrogenating function, and all of the phosphorus;

b) drying at a temperature in the range 75° C. to 130° C. without subsequent heat treatment;

c) at least one step for dry impregnation with an impregnation solution comprising dimethyl succinate and citric acid, and optionally acetic acid;

d) a step for maturation at 17-60° C.;

e) a step for drying, preferably in nitrogen, at a temperature in the range 80° C. to 160° C., without a subsequent heat treatment.

The catalytic precursor containing the hydrodehydrogenating function and an amorphous support based on alumina as well as its mode of preparation are described below.

Said catalytic precursor obtained at the end of step a) of the process of the invention may on the whole be prepared using any of the methods familiar to the skilled person.

Said catalytic precursor contains a hydrodehydrogenating function. Advantageously, it contains phosphorus and/or boron and/or fluorine as a dopant as well as the amorphous support.

The amorphous support of said catalytic precursor is based on alumina. It generally contains more than 25%, or even more than 35% and preferably more than 50% by weight of alumina. Preferably, it contains only alumina or silica-alumina, possibly with metal(s) and/or dopant(s) which are introduced separately from the impregnations (introduced, for example, during preparation—mixing, peptizing, etc, of the support or during shaping).

The support is obtained after shaping (preferably extrusion). It undergoes calcining, in general between 300° C. and 600° C.

Preferably, the support is constituted by alumina. Preferably, the alumina is gamma alumina and more preferably, said support is constituted by gamma alumina.

In another preferred case, it is a silica-alumina containing more than 25%, or even more than 35% and preferably at least (or more than) 50% by weight of alumina. The silica content in the support is at most 50% by weight, usually 45% by weight or less, preferably 40% by weight or less. Preferably, the support is constituted by silica-alumina.

Silicon sources are well known to the skilled person. Examples which may be cited are silicic acid, silica in powder form or in the colloidal form (silica sol), and tetraethylorthosilicate, $Si(OEt)_4$.

The term "amorphous support" means a support which does not contain crystalline phases apart from those which could exist in the alumina or silica-alumina.

The hydrodehydrogenating function of said catalytic precursor is provided by at least one element from group VIB and by at least one element from group VIII.

The total quantity of hydrodehydrogenating elements is advantageously more than 6% by weight of the oxide with respect to the total catalyst weight. The preferred elements from group VIB are molybdenum and tungsten, in particular molybdenum. The preferred elements from group VIII are non-noble elements, in particular cobalt and nickel. Advantageously, the hydrodehydrogenating function comprises (and preferably is constituted by) molybdenum, nickel and/or cobalt.

Advantageously, the hydrogenating function is selected from the group formed by the following combinations of elements: cobalt-molybdenum, nickel-molybdenum, nickel-cobalt-molybdenum, or nickel-molybdenum-tungsten.

In the case in which a high hydrodesulphurization or hydrodenitrogenation and hydrogenation of aromatics activity is desired, the hydrodehydrogenating function is advantageously provided by a combination of nickel and molybdenum; a combination of nickel and tungsten in the presence of molybdenum may also be advantageous. In the case of vacuum distillate or heavier type feeds, combinations of the cobalt-nickel-molybdenum type may advantageously be used.

Molybdenum precursors that may be used are also well known to the skilled person. Examples of sources of molybdenum which may be used are oxides and hydroxides, molybdic acids and their salts, in particular ammonium salts such as ammonium molybdate, ammonium heptamolybdate, phosphomolybdic acid ($H_3PMo_{12}O_{40}$) and their salts, and possibly silicomolybdic acid ($H_4SiMo_{12}O_{40}$) and its salts. The sources of molybdenum may also be any heteropolycompound of the Keggin, lacunary Keggin, substituted Keggin, Dawson, Anderson, or Strandberg type, for example. Preferably, molybdenum trioxide and heteropolycompounds (heteropolyanions) of the Strandberg, Keggin, lacunary Keggin or substituted Keggin type are used.

Tungsten precursors that may be used are also well known to the skilled person. Examples of tungsten sources which may be used are oxides and hydroxides, tungstic acids and their salts, in particular ammonium salts such as ammonium tungstate, ammonium metatungstate, phosphotungstic acid and their salts, and possibly silicotungstic acid ($H_4SiW_{12}O_{40}$) and its salts. The sources of tungsten may also be any heteropolycompound of the Keggin, lacunary Keggin, substituted Keggin, or Dawson, type, for example. Preferably, ammonium oxides and salts are used, such as ammonium metatungstate or heteropolyanions of the Keggin, lacunary Keggin or substituted Keggin type.

The quantity of precursor(s) of the element(s) from group VIB is advantageously in the range 5% to 40% by weight of the oxides from group VIB with respect to the catalytic precursor after the heat treatment of step ab) or b), preferably in the range 8% to 35% by weight and more preferably in the range 10% to 30% by weight.

The precursors of the element(s) from group VIII which may be used are advantageously selected from oxides, hydroxides, hydroxycarbonates, carbonates and nitrates; as an example, nickel hydroxycarbonate, cobalt carbonate or cobalt hydroxide are preferred.

The quantity of precursor(s) of the element(s) from group VIII is advantageously in the range 1% to 10% by weight of the oxides of group VIII with respect to the catalytic precursor after the heat treatment of step ab) or b), preferably in the range 1.5% to 9% by weight and highly preferably, in the range 2% to 8% by weight.

The hydrodehydrogenating function of said catalytic precursor may be introduced into the catalyst at various stages of the preparation and in a variety of manners. Said hydrodehydrogenating function is always introduced, at least in part and preferably in its entirety, by impregnation of the shaped support. It may also be introduced in part during shaping of said amorphous support.

In the case in which the hydrodehydrogenating function is introduced in part during shaping of said amorphous support, it may be introduced in part (for example at most 10% by weight of the element(s) from group VIB, for example introduced by mixing) only at the time of mixing with an alumina gel selected as the matrix, the remainder of the hydrogenating element(s) being introduced subsequently. Preferably, when the hydrodehydrogenating function is introduced in part at the time of mixing, the proportion of element(s) from group VIB introduced during said step is less than 5% by weight of the total quantity of element(s) from group VIB introduced onto the final catalyst. Preferably, at least one (or all) of the elements from group VIB is introduced at the same time as at least one (or all) of the elements from group VIII, irrespective of the mode of introduction. These methods and quantities for introducing the elements are in particular used in the case in which the hydrodehydrogenating function is constituted by CoMo.

In the case in which the hydrodehydrogenating function is introduced at least in part and preferably in its entirety after shaping said amorphous support, said hydrodehydrogenating function is advantageously introduced onto the amorphous support by one or more steps for excess solution impregnation on the shaped and calcined support, or preferably by one or more dry impregnation steps, and preferably by dry impregnation of said shaped and calcined support, using solutions containing the precursor salts of the metals. Highly preferably, the hydrodehydrogenating function is introduced in its entirety after shaping said amorphous support, by dry impregnation of said support using an impregnation solution containing the precursor salts of the metals. Introduction of said hydrodehydrogenating function may also advantageously be carried out by one or more steps for impregnation of the shaped and calcined support, using a solution of precursor(s) of the active phase. In the case in which the elements are introduced in a plurality of steps for impregnation of the corresponding precursor salts, a step for intermediate drying of the catalyst is generally carried out at a temperature in the range 50° C. to 180° C., preferably in the range 60° C. to 150° C. and more preferably in the range 75° C. to 130° C.

Phosphorus is also introduced into the catalyst. Another catalyst dopant may also be introduced which is preferably selected from boron and fluorine, used alone or as a mixture. The dopant is an added element which has no catalytic nature in itself but which increases the catalytic activity of the metal(s).

The source of boron may be boric acid, preferably orthoboric acid $H_3BO_3$, ammonium biborate or pentaborate, boron oxide, or boric esters. The boron may, for example, be introduced by means of a solution of boric acid in a water/alcohol mixture or in a water/ethanolamine mixture.

The preferred source of phosphorus is orthophosphoric acid, $H_3PO_4$, but its salts and esters such as ammonium phosphates are also suitable. The phosphorus may also be introduced at the same time as the element(s) from group VIB in the form of Keggin, lacunary Keggin, substituted or Strandberg type heteropolyanions.

The sources of fluorine which may be used are familiar to the skilled person. As an example, fluoride anions may be introduced in the form of hydrofluoric acid or its salts. These salts are formed with alkali metals, ammonium or an organic compound. In the latter case, the salt is advantageously formed in the reaction mixture by reaction between the organic compound and hydrofluoric acid. Fluorine may, for example, be introduced by impregnation of an aqueous solution of hydrofluoric acid, or of ammonium fluoride or of ammonium bifluoride.

The dopant is advantageously introduced into the catalytic precursor in a quantity of oxide of said dopant with respect to the catalytic precursor after heat treatment of step ab) or b):
  in the range 0 to 40% by weight, preferably in the range 0 to 30% by weight, and more preferably in the range 0 to 20% by weight, preferably in the range 0 to 15% by weight and still more preferably in the range 0 to 10% by weight when said dopant is boron; when boron is present, the minimum quantity is preferably 0.1% to 0.5% by weight;
  in the range 0.1% (or 0.5%) to 20% by weight, preferably in the range 0.1% (or 0.5%) to 15% by weight and more preferably in the range 0.1% (or 0.5%) to 10% by weight, when said dopant is phosphorus. This quantity represents the quantity of phosphorus introduced by impregnation. Hence, when preparing fresh catalyst, it represents the quantity which is impregnated during step a) and during step c) if it has not been impregnated or has not all been impregnated in step a). Concerning regenerated catalyst, this represents the quantity of phosphorus present on the spent catalyst after regeneration plus that impregnated during step c). The phosphorus present on the regenerated catalyst derives from impregnation which has taken place during the preparation of this catalyst in the fresh state;
  in the range 0 to 20% by weight, preferably in the range 0 to 15% by weight and more preferably in the range 0 to 10% by weight when said dopant is fluorine; when fluorine is present, the minimum quantity is preferably 0.1% or 0.5% by weight.

Phosphorus is always present. The phosphorus is generally introduced during impregnation of the support with at least one of the elements of the hydrodehydrogenating function (step a) of the process) and/or is introduced during impregnation with the succinate and the acid(s) (step c) of the process). Preferably, it is introduced in its entirety in step a), i.e. onto the catalytic precursor.

Advantageously, the phosphorus is introduced, in its entirety or in part, as a mixture with the precursor(s) of the hydrodehydrogenating function, onto the shaped amorphous support, preferably extrudates of alumina or silica-alumina, by dry impregnation of said amorphous support using a solution containing the precursor salts of the metals and the precursor(s) of the dopant(s).

Preferably, this is the same for the other dopants. The dopant may also be introduced upon synthesis of the support. It may also be introduced just before or just after peptizing the selected matrix, such as, for example and preferably, aluminium oxyhydroxide (boehmite), a precursor of alumina. In contrast, phosphorus must be introduced onto the shaped support, preferably by impregnation, and advantageously by dry impregnation.

Still more preferably, the "catalytic precursor" in step a) of the process of the invention is prepared with an impregnation solution containing at least one precursor of each element of the hydrodehydrogenating function, in the presence of a phosphorus precursor, the amorphous support being constituted by alumina or silica-alumina.

Introducing said hydrodehydrogenating function and optional dopant into or onto the shaped calcined support is then advantageously followed by a drying step b) during which the solvent for the metallic precursor salts of the metal oxide(s) (the solvent is generally water) is eliminated at a temperature in the range 50° C. to 180° C., preferably in the range 60° C. to 150° C. or in the range 65° C. to 145° C., and highly preferably in the range 70° C. to 140° C. or more preferably in the range 75° C. to 130° C.

In a process of the invention, the step for drying the "dried catalytic precursor" obtained is never followed by a step for heat treatment in air at a temperature of more than 200° C. Advantageously, in these temperature ranges, a temperature of at most 150° C. is used.

Thus, generally, in step a) of the process of the invention, said "catalytic precursor" is obtained by dry impregnation of a solution comprising one (or more) precursors of the hydrodehydrogenating function and phosphorus onto an amorphous support based on shaped and calcined alumina, followed by drying at a temperature of less than 180° C.

Thus, a "dried catalytic precursor" is obtained at the end of step b).

In another preparation process, after step a), the catalytic precursor is dried then calcined at a temperature of at least 350° C. The calcining temperature is less than 600° C. and usually less than 550° C., for example 350° C. to 550° C., and preferably in the range 400° C. to 520° C., or more preferably in the range 420° C. to 520° C. or in the range 450° C. to 520° C.; temperatures of less than 500° C. are advantageous.

In another preparation process, the spent catalyst (containing the hydrodehydrogenating function and phosphorus) is regenerated (step termed a'b')). This process will be detailed below. The regenerated catalyst obtained undergoes the steps described below.

In accordance with step c) of the process of the invention, said dried or calcined or regenerated catalytic precursor is impregnated with an impregnation solution comprising at least one C1-C4 dialkyl succinate (in particular dimethyl succinate) and citric acid and optionally acetic acid.

Said compounds are advantageously introduced into the impregnation solution of step c) of the process of the invention in a quantity (with respect to the catalytic precursor after heat treatment in step ab) or b)) corresponding to:

a molar ratio of dialkyl succinate (for example dimethyl) to the impregnated element(s) from group VIB of the catalytic precursor in the range 0.15 to 2 mole/mole, preferably in the range 0.3 to 1.8 mole/mole, preferably in the range 0.5 to 1.5 mole/mole and more preferably in the range 0.8 to 1.2 mole/mole; and a molar ratio of citric acid to impregnated element(s) from group VIB of the catalytic precursor in the range 0.05 to 5 mole/mole, preferably in the range 0.1 or 0.5 to 4 mole/mole, more preferably in the range 1.3 to 3 mole/mole and highly preferably in the range 1.5 to 2.5 mole/mole;

and, when acetic acid is present, a molar ratio of acetic acid to the impregnated element(s) from group VIB of the catalytic precursor in the range 0.1 to 6 mole/mole, preferably in the range 0.5 to 5 mole/mole, more preferably in the range 1.0 to 4 mole/mole and highly preferably in the range 1.5 to 2.5 mole/mole;

the molar ratio of citric acid+acetic acid to the impregnated element(s) from group VIB of the catalytic precursor being in the range 0.15 to 6 mole/mole.

In step c) of the process of the invention, the combination of dialkyl succinate and citric acid (optionally with acetic acid) is introduced onto the catalytic precursor (dried, calcined, regenerated) by means of at least one impregnation step, preferably in a single step for impregnating an impregnation solution onto said catalytic precursor.

Said combination may advantageously be deposited in one or more steps either by slurry impregnation or by excess impregnation, or by dry impregnation, or using any other means known to the skilled person.

In a preferred implementation of step c) of the preparation process of the invention, step c) is a single dry impregnation step.

In accordance with step c) of the process of the invention, the impregnation solution of step c) comprises at least a combination of C1-C4 dialkyl succinate (in particular dimethyl) and citric acid. Preferably, it also contains acetic acid.

The impregnation solution used in step c) of the process of the invention may be completed using any non-protic solvent known to the skilled person, in particular comprising toluene or xylene.

The impregnation solution used in step c) of the process of the invention may be completed using any polar solvent which is known to the skilled person. Said polar solvent employed is advantageously selected from the group formed by methanol, ethanol, water, phenol and cyclohexanol, used alone or as a mixture. Said polar solvent used in step c) of the process of the invention may also advantageously be selected from the group formed by propylene carbonate, DMSO (dimethylsulphoxide) or sulpholane, used alone or as a mixture. Preferably, a polar protic solvent is used. A list of the usual polar solvents and their dielectric constants may be found in the book "Solvents and Solvent Effects in Organic Chemistry" by C Reichardt, Wiley-VCH, $3^{rd}$ edition, 2003, pages 472-474).

Preferably, step c) is carried out in the presence of water and/or ethanol. Preferably, it contains only dialkyl succinate and citric acid and optionally acetic acid, as well as water and/or ethanol.

The dialkyl succinate used is preferably included in the group composed of dimethyl succinate, diethyl succinate, dipropyl succinate, diisopropyl succinate and dibutyl succinate. Preferably, the C1-C4 dialkyl succinate used is dimethyl succinate or diethyl succinate. Highly preferably, the C1-C4 dialkyl succinate used is dimethyl succinate. At least one C1-C4 dialkyl succinate is used, preferably just one, and preferably dimethyl succinate.

In accordance with step d) of the preparation process of the invention, the catalytic precursor or regenerated impregnated catalyst from step c) undergoes a maturation step. It is advantageously carried out at atmospheric pressure. The temperature is generally in the range 17° C. to 60° C. or in the range 17° C. to 50° C. In general, a maturation period in the range ten minutes to forty-eight hours, preferably in the range thirty minutes to five hours is sufficient. Longer times are not excluded. A simple means for adjusting the maturation period is to characterize the formation of the Keggin heteropolyanions by Raman spectroscopy in the dried impregnated catalytic precursor from step c) of the process of the invention. Highly preferably, to increase the productivity without modifying the quantity of reformed heteropolyanions, the maturation period is in the range thirty minutes to four hours. Still more preferably, the maturation period is in the range thirty minutes to three hours.

In accordance with step e) of the preparation process of the invention, the catalytic precursor or the catalyst from step d) undergoes a drying step.

The aim of this step is to obtain a catalyst which can be transported, stored and handled, in particular to charge the hydrotreatment unit. Advantageously, depending on the selected embodiment of the invention, all or a portion of any solvent which has served to introduce the combination of C1-C4 dialkyl (in particular dimethyl) succinate and citric acid is removed. In all cases, and in particular in the case in which the combination of C1-C4 dialkyl succinate (in particular dimethyl) and citric acid is used alone, the catalyst is made to look dry in order to prevent the extrudates from sticking to each other during the steps of transport, storage, handling or charging.

The drying step e) of the process of the invention is advantageously carried out using any technique which is known to the skilled person. It is advantageously carried out at atmospheric pressure or at reduced pressure. Preferably, this step is carried out at atmospheric pressure.

This step e) is advantageously carried out at a temperature of less than 200° C., generally in the range 50° C. to less than 200° C., preferably in the range 60° C. to 190° C. and highly preferably in the range 80° C. to 180° C. Advantageously, these temperature ranges are used without subsequent heat treatment at a temperature of more than 200° C.

It is advantageously carried out in a tunnel furnace, in a fluidized bed, a vibrated fluidized bed, a fluidized bed heat exchanger, a traversed bed or any technology which will allow drying and/or calcining, preferably in a fluidized bed. Preferably, the gas used is either air or an inert gas such as argon or nitrogen. Highly preferably, drying is carried out in nitrogen.

Preferably, the duration of this step is in the range 30 minutes to 4 hours, more preferably in the range 45 minutes to 3 hours.

At the end of step e) of the process of the invention, a dried catalyst is obtained which does not undergo any subsequent calcining steps or subsequent heat treatment steps at a temperature of more than 200° C.

The catalyst obtained at the end of step d) or step e) has a Raman spectrum comprising the most intense bands at 990 and 974 $cm^{-1}$ (Keggin type heteropolyanions), the bands corresponding to the succinate (for dimethyl succinate, the most intense band is at 853 $cm^{-1}$) and the characteristic bands of citric acid, the most intense of which are at 785 and 956 $cm^{-1}$, and optionally, the bands for acetic acid, the most intense of which is 896 $cm^{-1}$.

As described above, in another mode, the catalytic precursor onto which the succinate and acid (or acids) are impregnated is a regenerated spent catalyst the hydrogenating function of which is provided by at least one element from group VIB and by at least one element from group VIII. Their quantities and characteristics correspond to those cited above. The supports are also the same. Advantageously, this catalyst contains phosphorus, which has preferably been introduced by impregnation during preparation of the fresh catalyst.

Said regenerated catalyst has undergone a heat treatment step known as "regeneration" in the presence of oxygen, which may be pure or diluted. This step is intended to eliminate at least a portion of the coke present on the catalyst by combustion. No chemical treatment is carried out during this step.

The regeneration treatment may be carried out at a temperature in the range 350° C. to 550° C., and generally in the range 450° C. to 520° C., or in the range 420° C. to 520° C., or in the range 400° C. to 520° C. It is preferably carried out in the range 420° C. to 500° C., or in the range 450° C. to 520° C. depending on the nature of the carbon to be burned off. The skilled person will optimize the temperature necessary to burn off the coke (or its precursor) while avoiding or minimizing sintering of the catalyst.

During this step, the temperature must be monitored to allow combustion of the coke but not to exceed 550° C. on the catalyst, even locally. Exceeding a temperature of 550° C. could, for example, result in damaging its porosity. Such monitoring is well known to the skilled person. The temperature in the bed during this regeneration phase may be monitored using any technique known to the skilled person, such as by placing thermocouples in the bulk of the catalyst.

When this step is carried out with a mixture comprising oxygen, the diluent may be selected from nitrogen or any other inert gas. The quantity of oxygen may be fixed throughout the duration of the treatment, or it may vary during the course of the regeneration process. As an example, the temperature could change during the treatment in accordance with several phases, the temperatures could vary from ambient temperature to the final combustion temperature of the coke, which is still below 550° C. This duration of this regeneration step will depend on the quantity of catalyst to be treated and on the nature and quantity of the coke present. This duration may in practice vary from 0.1 hours to several days. Usually, it is in the range 1 hour to 20 hours.

The process for the preparation of the catalyst in accordance with this latter implementation then comprises the following steps which are identical to the other implementations:

c) at least one step for dry impregnation with an impregnation solution comprising C1-C4 dialkyl succinate (preferably dimethyl), and citric acid, and optionally acetic acid;

d) a step for maturation, generally at a temperature in the range 17° C. to 60° C.;

e) a step for drying, preferably in nitrogen, at a temperature of less than 200° C., generally at least 80° C., preferably in the range 80-180° C., without a subsequent calcining step.

Before using it, it is advantageous to transform the dried catalyst (after step e) into a sulphurized catalyst in order to form its active species. This activation or sulphurization phase is carried out using methods which are well known to the skilled person, and advantageously in a sulpho-reducing atmosphere in the presence of hydrogen and hydrogen sulphide.

At the end of step e) of the process of the invention (irrespective of whether the catalytic precursor is in the dried, calcined, regenerated, etc. state), said dried catalyst obtained thus advantageously undergoes a step f) for sulphurization without an intermediate calcined step. A sulphurized catalyst in accordance with the invention is obtained.

Said dried catalyst is advantageously sulphurized ex situ or in situ. The sulphurizing agents are gaseous $H_2S$ or any other compound containing sulphur used to activate hydrocarbon feeds with a view to sulphurizing the catalyst. Said sulphur-containing compounds are advantageously selected from alkyldisulphides such as, for example, dimethyldisulphide (DMDS), alkylsulphides such as dimethyl sulphide, n-butylmercaptan, polysulphide compounds of the tertion-onylpolysulphide type such as TPS-37 or TPS-54, for example, sold by the supplier ARKEMA, or any other compound known to the skilled person that can be used to sulphurize a catalyst effectively. Preferably, the catalyst is sulphurized in situ in the presence of a sulphurizing agent and a hydrocarbon feed. Highly preferably, the catalyst is sulphurized in situ in the presence of a hydrocarbon feed supplemented with dimethyldisulphide.

Finally, in another aspect, the invention concerns a process for the hydrotreatment of hydrocarbon feeds using the catalyst of the invention. Examples of such processes are hydrodesulphurization, hydrodenitrogenation, hydrodemetallization, aromatics hydrogenation and hydroconversion processes.

The dried catalysts obtained using the process of the invention and preferably having undergone a step f) for sulphurization are advantageously used to hydrotreat hydrocarbon feeds such as oil cuts, cuts from coal or hydrocarbons produced from natural gas, and more particularly for reactions of hydrogenation, hydrodenitrogenation, hydrodearomatization, hydrodesulphurization, hydrodemetallization or for the hydroconversion of hydrocarbon feeds.

In these uses, the catalysts obtained by the process of the invention and preferably which have undergone a sulphurization step f) have improved activity with respect to prior art catalysts. These catalysts may also advantageously be used during pre-treatment of feeds for the catalytic cracking or hydrodesulphurization of residues or deep hydrodesulphurization of gas oils (ULSD, ultra-low sulphur diesel).

Examples of the feeds used in the hydrotreatment processes are gasolines, gas oils, vacuum gas oils, atmospheric residues, vacuum residues, atmospheric distillates, vacuum distillates, heavy fuels, oils, waxes and paraffins, spent oils, residues or deasphalted crudes, or feeds deriving from thermal or catalytic conversion processes, used alone or as mixtures. The feeds which are treated, in particular those cited above, generally contain heteroatoms such as sulphur, oxygen and nitrogen and, for heavy feeds, they usually also contain metals.

The operating conditions used in the processes carrying out the reactions for the hydrotreatment of hydrocarbon feeds described above are generally as follows: the temperature is advantageously in the range 180° C. to 450° C., preferably in the range 250° C. to 440° C., the pressure is advantageously in the range 0.5 to 30 MPa, preferably in the range 1 to 18 MPa, the hourly space velocity is advantageously in the range 0.1 to 20 $h^{-1}$, preferably in the range 0.2 to 5 $h^{-1}$, and the hydrogen/feed ratio, expressed as the volume of hydrogen measured under normal temperature and pressure conditions per volume of liquid feed is advantageously in the range 50 L/L to 2000 L/L.

The examples below demonstrate the large gain in activity of catalysts prepared using the process of the invention compared with prior art catalysts and describe the invention in more detail without in any way limiting its scope.

EXAMPLE 1

Preparation of Comparative Regenerated Catalysts B1 and B2

A matrix was used which was composed of ultrafine tabular boehmite or alumina gel sold by the supplier Condea Chemie GmbH. This gel was mixed with an aqueous solution containing 66% nitric acid (7% by weight of acid per gram of dry gel) then mixed for 15 minutes. At the end of mixing, the paste obtained was passed through a die having cylindrical orifices with a diameter of 1.6 mm. The extrudates were then dried overnight at 120° C. and calcined at 600° C. for 2 hours in moist air containing 50 g of water per kg of dry air. Extrudates were obtained of a support composed solely of low crystallinity cubic gamma alumina.

Cobalt, molybdenum and phosphorus were added to the alumina support described above which was in the extruded form. The impregnation solution was prepared by dissolving molybdenum oxide (24.34 g) and cobalt hydroxide (5.34 g) in hot phosphoric acid solution (7.47 g) in aqueous solution. After dry impregnation, the extrudates were left to mature at ambient temperature (20° C.) in an atmosphere saturated with water for 12 h, then they were dried overnight at 90° C. and calcined at 450° C. for 2 hours. The calcined catalyst A was obtained. The final composition of catalyst A, expressed in the form of the oxides, was thus as follows: $MoO_3$=22.5±0.2 (% by weight), $CoO$=4.1±0.1 (% by weight) and $P_2O_5$=4.0±0.1 (% by weight).

The calcined catalyst A was charged into a traversed bed unit and sulphurized with a straight run gas oil supplemented with 2% by weight of dimethyldisulphide. A HDS test of a mixture of straight run gas oil and gas oil from catalytic cracking was then carried out for 300 h. After the test, the spent catalyst was discharged, recovered and washed with toluene under reflux then separated into two batches. The first batch was regenerated in a combination furnace controlled by introducing increasing quantities of oxygen for each temperature stage, which limited the exothermicity linked to combustion of the coke. The final regeneration stage was 450° C. The regenerated catalyst was analyzed by XRD. The absence of a line at 26°, characteristic of the presence of crystalline $CoMoO_4$, was noted. This catalyst will henceforth be denoted B1. The second batch of washed spent catalyst was regenerated in a muffle furnace at 450° C. without controlling the exothermicity of the coke combustion. XRD analysis carried out after regeneration showed the presence of a thin line at 26°, characteristic of the presence of crystalline $CoMoO_4$. Further, this catalyst, henceforth denoted B2, had a very pronounced bright blue colour.

EXAMPLE 2

Preparation of a Regenerated Catalyst C1 in Accordance with the Invention—Production with Citric Acid Catalyst C1 was prepared by dry impregnation of a solution of citric acid and dimethyl succinate diluted in ethanol onto catalyst B1. The intended quantities of citric acid (CA) and dimethyl succinate (DMSU) were respectively 15% by weight and 10% by weight (i.e. AC/Mo=0.50 mole/mole and DMSU/Mo=0.44 mole/mole). After a maturation period of 24 hours in a closed vessel at ambient temperature, the catalyst was dried in a stream of nitrogen (1 NL/g/g) for 1 hour.

Catalyst C1 was analyzed by Raman spectroscopy. In particular, it had a principal band of the Keggin HPA at 990 $cm^{-1}$ and characteristic bands of citric acid and dimethyl succinate respectively at 785 $cm^{-1}$ and 851 $cm^{-1}$.

EXAMPLE 3

Preparation of a Regenerated Catalyst C2 in Accordance with the Invention—Production with Citric Acid and Acetic Acid Catalyst C2 was prepared by dry impregnation of a solution of citric acid, dimethyl succinate and acetic acid diluted in ethanol onto catalyst B2 which had a crystalline $CoMoO_4$ phase. The intended quantities of citric acid (CA), dimethyl succinate (DMSU) and acetic acid (AA) were respectively 15% by weight, 10% by weight and 20% by weight (i.e. AC/Mo=0.50 mole/mole, DMSU/Mo=0.44 mole/mole and AA/Mo=2.13 mole/mole). After a maturation period of 24 hours in a closed vessel at ambient temperature, the catalyst was dried in a stream of nitrogen (1 NL/g/g) for 1 hour.

Catalyst C2 was analyzed by Raman spectroscopy. In particular, it had a principal band of the Keggin HPA at 990 $cm^{-1}$ and characteristic bands of citric acid, dimethyl succinate and acetic acid respectively at 785 $cm^{-1}$, 851 $cm^{-1}$ and 896 $cm^{-1}$.

EXAMPLE 2BIS

Preparation of a Regenerated Catalyst C1Bis in Accordance with the Invention—Production with Citric Acid and Acetic Acid The catalyst was prepared in the same manner as for Example 3, but using regenerated catalyst B1.

EXAMPLE 3BIS

Preparation of a Regenerated Catalyst C2Bis in Accordance with the Invention—Production with Citric Acid The catalyst was prepared in the same manner as for Example 2, but using regenerated catalyst B2.

EXAMPLE 4

Comparative Test of Catalysts B1, B2, C1, C2, C1Bis and C2Bis in the Hydrogenation of Toluene in Cyclohexane Under Pressure and in the Presence of Hydrogen Sulphide The catalysts described above were sulphurized dynamically in situ in the traversed fixed bed of a tube reactor of a Microcat type pilot unit (made by Vinci), the fluids moving from top to bottom. Hydrogenating activity measurements were carried out immediately after sulphurization under pressure and with no ingress of air, using the hydrocarbon feed which served to sulphurize the catalysts.

The sulphurization and test feed was composed of 5.8% of dimethyldisulphide (DMDS), 20% of toluene and 74.2% of cyclohexane (by weight).

The sulphurization was carried out from ambient temperature to 350° C. with a temperature ramp-up of 2° C./min, a HSV of 4 h$^{-1}$ and H$_2$/HC=450 NL/L. The catalytic test was carried out at 350° C. at a HSV of 2 h$^{-1}$ and H$_2$/HC equivalent to that of sulphurization, with a minimum of 4 samples being taken for analysis by gas chromatography.

In this way, the stabilized catalytic activities of equal volumes of catalysts was measured for the toluene hydrogenation reaction.

The detailed conditions of the activity measurement were as follows:
- total pressure: 6.0 MPa;
- toluene pressure: 0.37 MPa;
- cyclohexane pressure: 1.42 MPa;
- methane pressure: 0.22 MPa;
- hydrogen pressure: 3.68 MPa;
- H$_2$S pressure: 0.22 MPa
- volume of catalyst: 4 cm$^3$ (extrudate length between 2 & 4 mm);
- hourly space velocity: 2 h$^{-1}$;
- test and sulphurization temperature: 350° C.

The liquid effluent samples were analyzed by gas chromatography. The molar concentrations of unconverted toluene (T) and the concentrations of its hydrogenation products (methylcyclohexane (MCC6), ethylcyclopentane (EtCC5) and dimethylcyclopentanes (DMCC5)) were used to calculate a degree of toluene hydrogenation, $X_{HYD}$, defined by:

$$X_{HYD}(\%) = 100 \times \frac{MCC6 + EtCC5 + DMCC5}{T + MCC6 + EtCC5 + DMCC5}$$

Since the toluene hydrogenation reaction is first order under the test conditions employed and the reactor behaves as an ideal piston reactor, the hydrogenating activity $A_{HYD}$ of the catalysts could be calculated by applying the formula:

$$A_{HYD} = \frac{\ln(100)}{(100 - X_{HYD})}$$

Table 1 compares the relative hydrogenating activities of catalysts B1 and B2 (not in accordance), and catalysts C1 and C2 (in accordance with the invention), equal to the ratio of the activity of the catalyst to the activity of catalyst B2 (not in accordance) taken as the reference (100% activity).

TABLE 1

Relative activities with respect to calcined catalyst B2 (not in accordance)

| Catalyst | Type of acid | Quantity of acid (wt % with respect to final catalyst) | Type of organic additive | Quantity of organic additive (wt % with respect to final catalyst) | Relative $A_{HYD}$ with respect to B2 (%) |
|---|---|---|---|---|---|
| Regenerated B1, not in accordance | — | 0 | — | 0 | 100 |
| Regenerated B2, not in accordance | — | 0 | — | 0 | 87 |
| C1, in accordance | CA | 15 | DMSU | 10 | 116 |
| C2, in accordance | CA + AA | 15 + 20 | DMSU | 10 | 119 |
| C1bis (from B1) in accordance | CA + AA | 15 + 20 | DMSU | 10 | 120 |
| C2bis (from B2) in accordance | CA | 15 | DMSU | 10 | 108 |

The catalyst regenerated under uncontrolled conditions, B2, (not in accordance), had a lower activity than the regenerated catalyst B1 (not in accordance).

Table 1 shows that the supplemented catalyst C1 (in accordance) prepared by adding 15% by weight of citric acid (CA) and 10% of dimethyl succinate (DMSU) to catalyst B1, had an improved activity, compared with the starting catalyst, of 16%; adding acetic acid increased the gain to 20% (catalyst C1bis).

Table 1 shows that the supplemented catalyst C2bis (in accordance) prepared by adding 15% by weight of citric acid (CA) and 10% of dimethyl succinate (DMSU) to catalyst B2, had an improved activity compared with the starting catalyst, of 24%; adding acetic acid increased the gain to 37% (catalyst C2).

These catalytic results show the particular and surprising effect of a combination of citric acid (AC) and dimethyl succinate (DMSU) on regenerated catalyst (in accordance with the invention) and in particular on a regenerated catalyst which has crystalline phases (B2). This effect is further improved by adding acetic acid.

The invention claimed is:

1. A catalyst comprising an amorphous support based on alumina, at least one C1-C4 dialkyl succinate, citric acid, phosphorus, acetic acid and a hydrodehydrogenating function comprising at least one element from group VIB and at least one element from group VIII of the Periodic Table, with the Raman spectrum of the catalyst comprising a band at 896 cm$^{-1}$, characteristic of acetic acid and comprising bands at 990 cm$^{-1}$, at 974 cm$^{-1}$ or at both 990 cm$^{-1}$ and 974 cm$^{-1}$, characteristic of at least one Keggin heteropolyanion, the characteristic bands of said succinate and the principal characteristic bands of citric acid, the catalyst being prepared from a precursor having:
- a molar ratio of dialkyl succinate to the at least one element from group VIB of the precursor in the range 0.15 to 2 mole/mole
- a molar ratio of citric acid to element(s) from group VIB of the precursor in the range 0.5 to 4 mole/mole
- a molar ratio of acetic acid to the element(s) from group VIB of the precursor in the range 0.5 to 5 mole/mole
- the molar ratio of citric acid+acetic acid to the element(s) from group VIB of the precursor in the range 1.0 to 6 mole/mole.

2. The catalyst according to claim 1, in which the dialkyl succinate is dimethyl succinate and in which the Raman spectrum of the catalyst has principal bands at 990 cm$^{-1}$, at 974 cm$^{-1}$ or at both 990 cm$^{-1}$ and 974 cm$^{-1}$, characteristic of Keggin heteropolyanions, and at 853 cm$^{-1}$, characteristic of dimethyl succinate and at 785 and 956 cm$^{-1}$, characteristic of citric acid and at 896 cm$^{-1}$, characteristic of acetic acid.

3. The catalyst according to claim 1, in which the dialkyl succinate is diethyl succinate, dibutyl succinate or diisopropyl succinate.

4. The catalyst according to claim 1, in which the support contains more than 25% by weight of alumina.

5. The catalyst according to claim 1, comprising a support constituted by alumina or constituted by silica-alumina.

6. The catalyst according to claim 1, also comprising boron and/or fluorine.

7. The catalyst according to claim 1, in which the hydrodehydrogenating function comprises molybdenum, nickel, cobalt or a mixture of any of these metals.

8. The catalyst according to claim 1, which is sulphurized.

9. A process for preparing a catalyst according to claim 1, said process comprising the following steps in succession:
   a) preparing a catalytic precursor containing the elements of the hydrodehydrogenating function, and optionally phosphorus, said precursor having undergone a heat treatment;
   b) at least one impregnation with an impregnation solution comprising at least one C1-C4 dialkyl succinate, citric acid and at least one compound of phosphorus, if the phosphorus has not been introduced in totality by impregnation in step a), and acetic acid;
   c) maturation;
   d) drying at a temperature of less than 200° C., without a subsequent calcining step,
   in which the dialkyl succinate and citric acid are introduced into the impregnation solution of step b) in a quantity corresponding to a molar ratio of dialkyl succinate to the impregnated element(s) from group VIB of the catalytic precursor in the range 0.15 to 2 mole/mole, and in a molar ratio of citric acid to the impregnated element(s) from group VIB of the catalytic precursor in the range 0.5 to 4 mole/mole, the molar ratio of acetic acid to the impregnated element(s) from group VIB of the catalytic precursor is in the range 0.5 to 5 mole/mole, and the molar ratio of citric acid+acetic acid to the impregnated element(s) from group VIB of the catalytic precursor is in the range 1.0 to 6 mole/mole.

10. The process for preparing a catalyst according to claim 9, said process comprising the following steps in succession:
   a) at least one impregnation of an amorphous support based on alumina with at least one solution containing the elements of the hydrodehydrogenating function, and optionally phosphorus;
   b) drying at a temperature below 180° C. optionally followed by calcining at a temperature of at least 350° C.;
   c) at least one impregnation with an impregnation solution comprising at least one C1-C4 dialkyl succinate, citric acid, at least one compound of phosphorus, if the phosphorus has not been introduced in its entirety in a), and acetic acid;
   d) maturation;
   e) drying at a temperature of less than 200° C., without a subsequent calcining step,
   in which the dialkyl succinate and citric acid are introduced into the impregnation solution of c) in a quantity corresponding to a molar ratio of dialkyl succinate to the impregnated element(s) from group VIB of the catalytic precursor in the range 0.15 to 2 mole/mole, and in a molar ratio of citric acid to the impregnated element(s) from group VIB of the catalytic precursor in the range 0.5 to 4 mole/mole, the molar ratio of acetic acid to the impregnated element(s) from group VIB of the catalytic precursor is in the range 0.5 to 5 mole/mole, and the molar ratio of citric acid+acetic acid to the impregnated element(s) from group VIB of the catalytic precursor is in the range 1.0 to 6 mole/mole.

11. The process according to claim 10, in which the whole of the hydrodehydrogenating function is introduced during step a).

12. The process for preparing a catalyst according to claim 9, said process comprising the following steps in succession:
   a) regenerating spent catalyst comprising a hydrodehydrogenating function and optionally phosphorus;
   b) at least one impregnation with an impregnation solution comprising at least one C1-C4 dialkyl succinate, citric acid, optionally at least one compound of phosphorus if the phosphorus has not been introduced into the catalyst in its entirety in step a), and acetic acid;
   c) maturation;
   d) drying at a temperature of less than 200° C., without a subsequent calcining step,
   in which the dialkyl succinate and citric acid are introduced into the impregnation solution of step b) in a quantity corresponding to a molar ratio of dialkyl succinate to the impregnated element(s) from group VIB of the catalytic precursor in the range 0.15 to 2 mole/mole, and in a molar ratio of citric acid to the impregnated element(s) from group VIB of the catalytic precursor in the range 0.5 to 4 mole/mole, the molar ratio of acetic acid to the impregnated element(s) from group VIB of the catalytic precursor is in the range 0.5 to 5 mole/mole, and the molar ratio of citric acid+acetic acid to the impregnated element(s) from group VIB of the catalytic precursor is in the range 1.0 to 6 mole/mole.

13. The process according to claim 9, in which step b) is carried out in the presence of water and/or ethanol.

14. The process according to claim 9, in which step c) is carried out at a temperature of 17° C. to 50° C.

15. The process according to claim 9, in which step d) is carried out at a temperature of 80° C. to 180° C., without subsequent calcining.

16. The process according to claim 9, in which the quantity of phosphorus introduced by impregnation is in the range 0.1% to 20% by weight expressed as the weight of oxide with respect to the catalytic precursor after heat treatment in step a) or b), the quantity of element(s) from group VIB is in the range 5% to 40% by weight expressed as the weight of oxide with respect to the catalytic precursor after heat treatment in step a) or b), and the quantity of element(s) from group VIII is in the range 1% to 10% by weight expressed as the weight of oxide with respect to the catalytic precursor after heat treatment in step a) or b).

17. The process according to claim 9, in which the product obtained at the end of step e) undergoes a sulphurization step.

18. A process for the hydrotreatment of a hydrocarbon feed in the presence of a catalyst in accordance with claim 1, which comprises contacting the hydrocarbon feed with the catalyst in accordance with claim 1.

19. The process according to claim 18, in which the hydrotreatment is hydrodesulphurization, hydrodenitrogenation, hydrodemetallization, hydrogenation of aromatics or hydroconversion.

20. The process according to claim 19, in which the hydrotreatment is deep gas oil hydrodesulphurization.

* * * * *